(12) United States Patent
Chow

(10) Patent No.: US 8,881,268 B2
(45) Date of Patent: Nov. 4, 2014

(54) SECURE AREA FOR APPS

(75) Inventor: Edmond K. Chow, Hong Kong (CN)

(73) Assignee: Loopmark Limited, Hong Kong (HK)

( * ) Notice: Subject to any disclaimer, the term of this patent is extended or adjusted under 35 U.S.C. 154(b) by 0 days.

(21) Appl. No.: 13/269,553

(22) Filed: Oct. 7, 2011

(65) Prior Publication Data

US 2012/0090023 A1  Apr. 12, 2012

Related U.S. Application Data

(60) Provisional application No. 61/391,033, filed on Oct. 7, 2010.

(51) Int. Cl.
*G06F 21/00* (2013.01)
*G06F 7/04* (2006.01)

(52) U.S. Cl.
CPC ..................................... *G06F 21/00* (2013.01)
USPC ............................................ 726/19; 726/16

(58) Field of Classification Search
CPC ....................................................... G06F 21/00
USPC ..................................................... 726/19, 16
See application file for complete search history.

(56) References Cited

U.S. PATENT DOCUMENTS

| 6,826,762 | B2 * | 11/2004 | Shell et al. | 719/328 |
| 7,861,274 | B2 * | 12/2010 | Chen et al. | 725/97 |
| 8,290,480 | B2 * | 10/2012 | Abramson et al. | 455/418 |
| 2008/0051072 | A1 * | 2/2008 | Kraft et al. | 455/418 |

FOREIGN PATENT DOCUMENTS

| CN | 101611613 A | 12/2009 |
| CN | 101627608 A | 1/2010 |
| WO | 2008/105927 A1 | 9/2008 |
| WO | 2008/109866 A2 | 9/2008 |

OTHER PUBLICATIONS

Mark Dodge, (Microsoft® Office Excel 2003 Inside Out. 2003).*

* cited by examiner

*Primary Examiner* — Saleh Najjar
*Assistant Examiner* — Oleg Korsak
(74) *Attorney, Agent, or Firm* — Baker & Hostetler LLP

(57) ABSTRACT

An invention for providing privacy and restricted access to functions available on a computing device. According to one embodiment, an area accessible to a user interface on a computing device is provided. A request from a user of the device is accepted, the request for associating with the area one or more functions available on the device. The one or more functions are then associated with the area, and the one or more functions are made invisible. Another request from the user is accepted, the other request for gaining access to the area. Authentication against the user is requested. Access to the one or more functions is granted if the authentication is successful, and access to the one or more functions is not granted if the authentication is not successful.

18 Claims, 4 Drawing Sheets

SECURE AREA FOR APPS

CROSS REFERENCE TO RELATED APPLICATIONS

This application claims benefit under 35 U.S.C. §119(e) of provisional U.S. patent application No. 61/391,033, filed Oct. 7, 2010, the contents of which are incorporated herein by reference in its entirety.

TECHNICAL FIELD

The present invention relates to systems, methods, processes, and products of access control to resources available on a computing device. In particular, it provides privacy and restricted access to functions available on a computing device.

BACKGROUND

A computing apparatus or device may be equipped with a means to authenticate a user for access. However, there may be applications or functions (herein referred to as apps) on the device that a user would access or use often but not wanting the need for device-level authentication every time he wishes to do so. On the other hand, some apps may provide their own authentication (optional or otherwise), so that a user may disable authentication for the device, and rely on such app-specific authentication. In this case, the user needs to be authenticated individually by these apps, and manage the credentials (e.g., user name and password) for all these apps.

SUMMARY

According to one embodiment, a computing device provides an area, the area including a folder, an icon, a screen page, or a virtual screen. The device accepts a request to associate one or more functions with the area. The device associates the one or more functions with the area, and makes invisible the one or more functions outside the area. The device then accepts a request to access the area. It requests authentication. It provides access to the one or more functions if the authentication is successful, and denies access to them if not successful.

OBJECTS AND ADVANTAGES

Embodiments of the present invention provide access control to a collection of apps, and access to them needs not be individually authenticated. These apps may also be made invisible or opaque for privacy purposes. Different levels of app availability may also be made available so that only a subset of apps is visible and accessible to a user. For example, one level may be configured to make visible and accessible apps intended for children, while hiding other apps.

DETAILED DESCRIPTION OF ILLUSTRATIVE EMBODIMENTS

Disclosed are methods, systems, and devices for restricting access to one or more apps on a device. For instance, a method for restricting access to one or more apps and their data is described, the method comprising providing an area; accepting a request to associate one or more functions with the area; associating the one or more functions with the area; accepting a request for access to the area; requesting for authentication; providing access to the one or more functions, if the authentication is successful; and denying access to the one or more functions, if the authentication is not successful. According to another embodiment, a computing device provides an area, the area including a folder, an icon, a screen page, or a virtual screen. The device accepts a request to associate one or more functions with the area. The device associates the one or more functions with the area, and makes invisible the one or more functions outside the area. The device then accepts a request to access the area. It requests authentication. It provides access to the one or more functions if the authentication is successful, and denies access to them if not successful.

Figure 1:
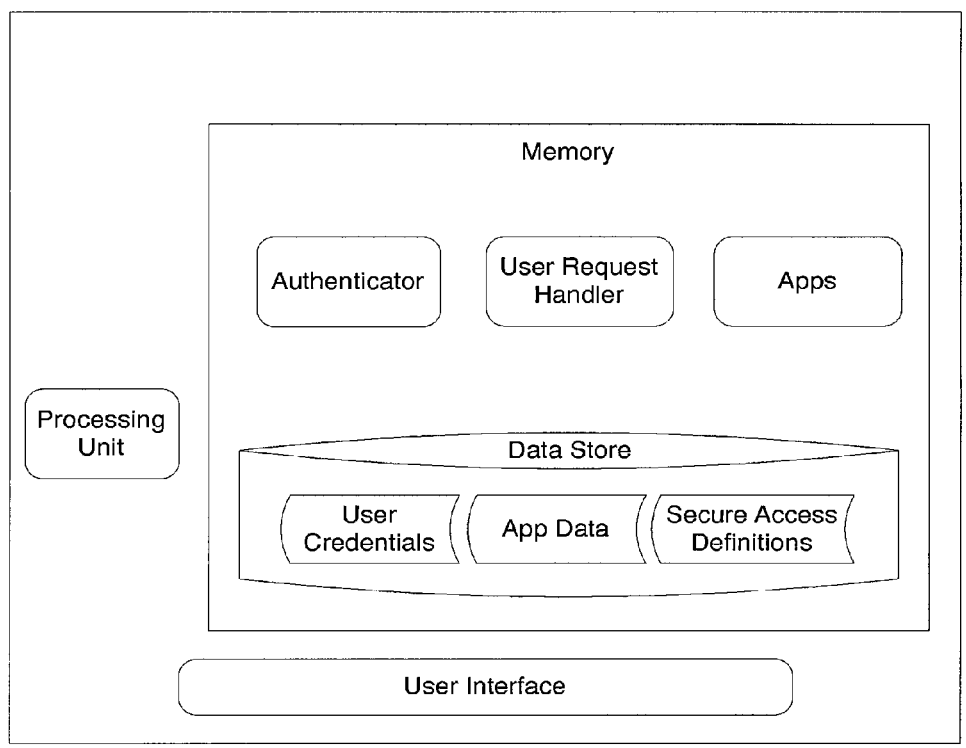
FIG. 1 shows a block diagram of a device in accordance with an embodiment.

FIG. 1 shows a block diagram of an exemplary device equipped with the present invention. The device comprises a processing unit, a memory, and a user interface. The device (e.g., a mobile phone, personal digital assistant, computing tablet, desktop phone, a portable or desktop computer, a control terminal, and so on) is communicatively coupled to a user via the user interface (e.g., a display, a speaker, a microphone, a keyboard, a touch screen, and so on). Any type of user interface is within the scope of various embodiments.

The user interface is provided for interacting with a user, including receiving requests for designating an app for restricted access and accessing the app or a restricted area, view or screen in or with which the app is protected or associated.

The memory is provided for storing programs and data for the operation of the device. It includes an authenticator, a user request handler, one or more apps, and a data store, the data storing comprising user credentials, app data, and secure access definitions. The user request handler is responsible for interpreting requests sent by a user via the user interface, such as associating apps with a secure or restricted area, assigning apps to a secure or restricted area, view or screen, and deciding if authentication is required in relation to accessing the secure or restricted area so to run or make visible the one or more apps and their data installed or otherwise accessible through the device. The authenticator is responsible for prompting for and accepting input from the user, for example, to decide if a secure area comprising the apps in question should be made visible or available to the user, as well as other authentication-related activities, such as creating or changing user credentials. If the authentication is successful, the authenticator may then allow the requested operation or effect to proceed. Otherwise, the user is notified of such denial. The user credentials in the data store is used for such authentication purpose (e.g., as executed by the authenticator), while the secure access definitions there provides the rules or boundaries under which an authentication is required. The app data provides data storage for the one or more apps.

The processing unit is provided for executing the programs (e.g., the authenticator, user request handler, and apps) in the memory, and the user interface for interacting with a user.

In some embodiments, the secure access definitions may be part of the user request handler, or the authenticator be part of the user request handler. As such, although the device is described as being comprised of these various components, fewer or more components may comprise the device shown in FIG. 1, and still fall within the scope of various embodiments.

In one embodiment, a user via the user interface selects an app for configuration (e.g., by touching and holding for a pre-determined period of time an icon for the app on a touch screen), and specifies that the app be associated with a secure area, such as a folder, a screen view or page, or a virtual screen available on the device. (E.g., the user may gesture to the device via screen scrolling that he wants to access to the next screen view or page to the right of the current screen view or page, or an out-of-sight virtual screen positioned virtually at the top of the current screen, the next screen view or page, or the out-of-sight virtual screen being designated or configured as a secure area.)

Such specification or association may be performed via a configuration file, settings page, or the selected icon (e.g., dragging the icon to the secure area). The user request handler or its equivalent stores this configuration in the secure access definitions. If the user does not yet have credentials established for such authentication, then the user request handler causes the authenticator to prompt the user to establish one, and to handle the subsequent interaction with the user. Alternatively, the user request handler may do so with the user via the user interface. Successfully established, the credentials are stored in the user credentials in the data store. The user may also change the credentials via the authenticator independent of any app invocation or configuration for access. If the user wishes to no longer restrict access to the app, then he may be first authenticated by the authenticator before being granted the permission to make such change. (E.g., to disassociate an app with a secure area, the user may touch, hold, and drag the icon for the app in the secure area to outside.) The user request handler updates the secure access definitions accordingly.

Upon receiving a request from a user to access an area or screen through the user interface, the user request handler checks if there is any applicable data in the secure access definitions for the area or screen. If so, it causes the authenticator to interact with the user and authenticate him against the data in the user credentials in the data store. Otherwise, the area or screen may be accessible without further permission or credentials checking. Should the authentication in the former case be successful, the area or screen may be accessible, thereby making the apps therein available to the user.

In an embodiment, a touch-screen device presents a list, view or inventory of available apps on one or more visual pages or areas, where a user may go from one page or area to another. For example, a so-called home screen on the device may comprise more than one set of apps, where each set of apps is displayed or otherwise presented independently from the other sets. The user may gesture to the device (e.g., by swiping across the screen) to select the previous or next set or sets in relation to the current set of apps. Each set of apps so display or presented makes up a view, each of which may extend beyond what the physical screen of the device can show at any one point in time. For example, individual views may be organized horizontally while the icons of the apps vertically. Animations such as that of sliding from one page to the previous or next, either horizontally or vertically, may accompany this change of view. The user interface is responsible for such interaction with the user.

In one instance, the user indicates via the user interface to the user request handler that one view is configured to become a restricted area, in that access to it would require authentication of the user by the authenticator. Upon successful authentication, the user may access this restricted area or view, and assign apps to it (e.g., by moving their icons into the area or view), thereby removing these apps from authentication-free access at the app execution level even when the device-level authentication, if any, has been successfully performed or otherwise been disabled. That is, to gain access to apps with restricted access, the user needs to be authenticated by the authenticator. Successful authentication enables the user to access all apps in the restricted view or area for which the authentication is performed. Such authentication may be required every time access to the restricted area or view, or to the individual apps within it, is requested by the user, or when there is some inactivity of the device or apps in question since the last successful authentication. Or the user may open and close restricted areas or views manually via the user interface, so that the user request handler may then decide in accordance to this manual setting if access to the restricted areas is granted and whether authentication is needed.

The user may also designate two or more sections of views, one or more of which comprising one or more restricted areas or views. Between any two sections may be a demarcation or partition point, line or interface (visible or otherwise), where authentication will be required if the user requests access to a section of restricted areas or views, and not required if he requests access to a section of non-restricted areas or views. Different sections of restricted areas or views may have different passwords or credentials for authentication. In addition, the same app with different data sets may also appear in different sections. For example, a phone app may appear in both the non-restricted and restricted areas, where the phone app in the restricted area has access to different contact data and call logs compared to the one in the non-restricted area. Another example app is a photo album app. That is, the data that an app may have access to defines the function of the app and distinguish it from the otherwise same app that does not have access to the data (but perhaps to other data). In one embodiment, the Secure Access Definition such as the one shown in FIG. 1 stores and maintains the relationships between the apps and their respective data in relation to the sections that they are applicable to. For instance, the user may specify an email address for which messages received will be associated with an email app in a section of restricted areas, while messages received for all other email addresses will be associated with an email app in another section.

Figure 2:
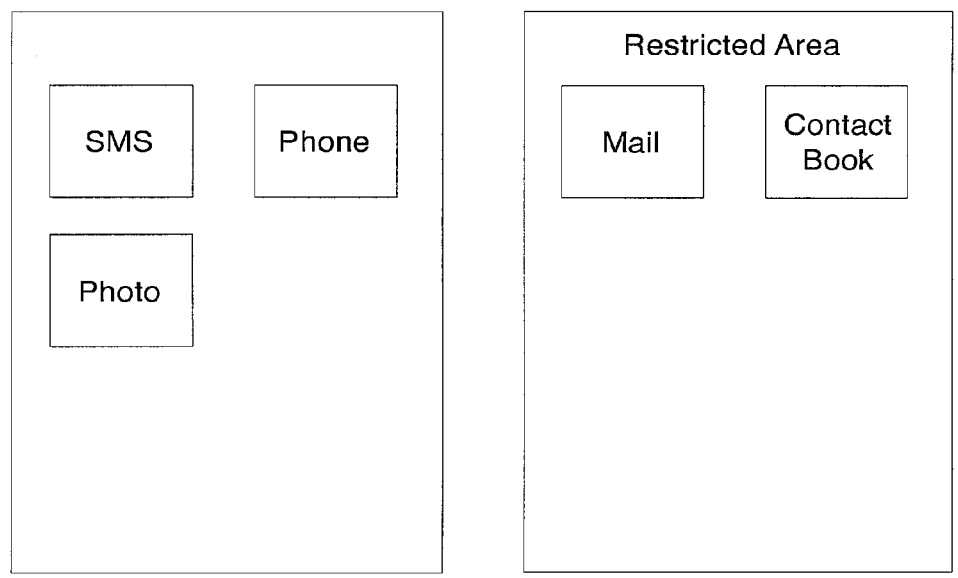
FIG. 2 shows screenshots on a device in accordance with an embodiment.

FIG. 2 shows an exemplary display of screen that may be presented on a device embodying the one depicted in FIG. 1. There are two screen shots, each representing an area or view of apps or their icons. The one on the right is a restricted area whereas the on the left is not. As such, the left screen, area or view will be accessible to the user without the need for authentication, while the data associated with the apps whose icons appearing in this screen, area, or view (i.e., SMS, Phone, and Photo) are available to the user also without any authentication. On the other hand, since the right screen, area, or view is restricted, a user will not gain access or visibility to it until successful authentication. As such, the apps (i.e., Mail and Contact Book) in this screen, area, or view will be protected from unauthorized access. The data associated with these apps are likewise unavailable to the user or other apps that the user may be using or capable of invoking without authentication.

Figure 3:
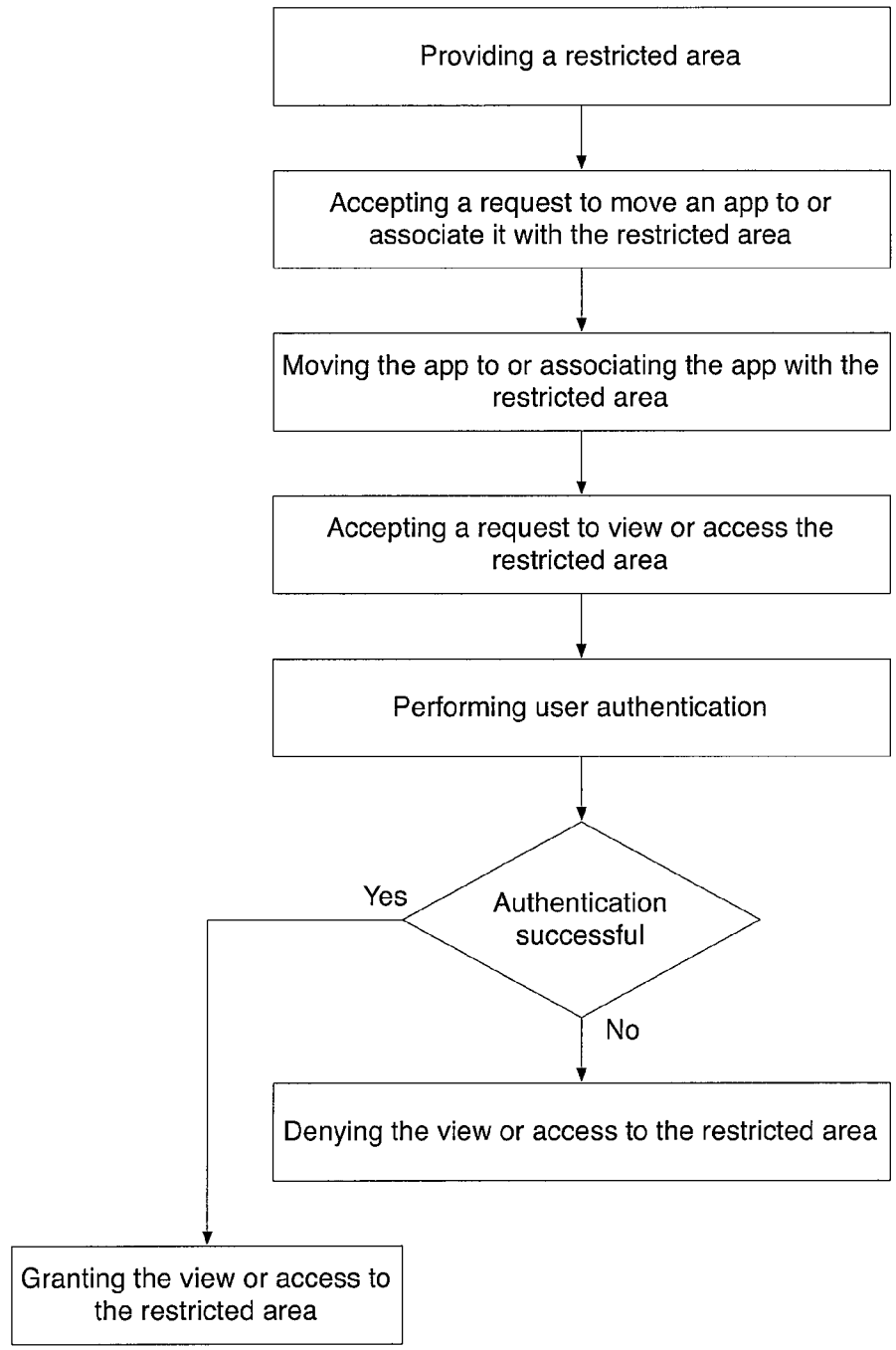
FIG. 3 shows a computerized method in accordance with an embodiment.

FIG. 3 shows a flow diagram of an exemplary process for configuring an app for authentication on a device, such as the one shown in FIG. 1, with a display or screen an example of which is depicted in FIG. 2. For instance, the user interface provides a restricted area, view or screen, which may be disabled, enabled or otherwise configurable by the user. If there are no user credentials available yet, the user request handler will cause the authenticator to interact with the user via the user interface, so to obtain them, before the restricted area, view or screen may be activated, enabled or otherwise created. (In one embodiment, the user password for the device, if available, will be used as the initial user credentials for restricted areas, views, or screens.) The authenticator (or in some embodiments, the user request handler) will store the information in the user credentials in the data store. The user request handler accepts a request via the user interface to move an app to or otherwise associate it with the restricted area, such as having the user pressing, holding and dragging the app icon from an unrestricted area, view or screen, to the restricted one. The handler causes the user interface to remove the app icon from the unrestricted area to the restricted one, and stores in the secure access definitions this membership in or association with the restricted area, view or screen. (Such setting in the secure access definitions, for example, may cause the data maintained by or otherwise associated with the app to become unavailable to other apps that may otherwise have access to them, such as the data in Contact Book app being available to the Phone app.) Then the user request handler receives a request from the user via the user interface (e.g., by gesturing the intent to access the restricted area from the unrestricted one, such as those shown in FIG. 2) to access the restricted area. The handler causes the authenticator to request user credentials (e.g., password) or otherwise authenticate with the user. If the authentication is successful, then the authenticator causes the user request handler to make visible or otherwise accessible the restricted area to the user via the user interface, thereby enabling access to the apps therein, as well as making available the data of these apps to other apps. Otherwise, the secured area access request is denied.

Figure 4:
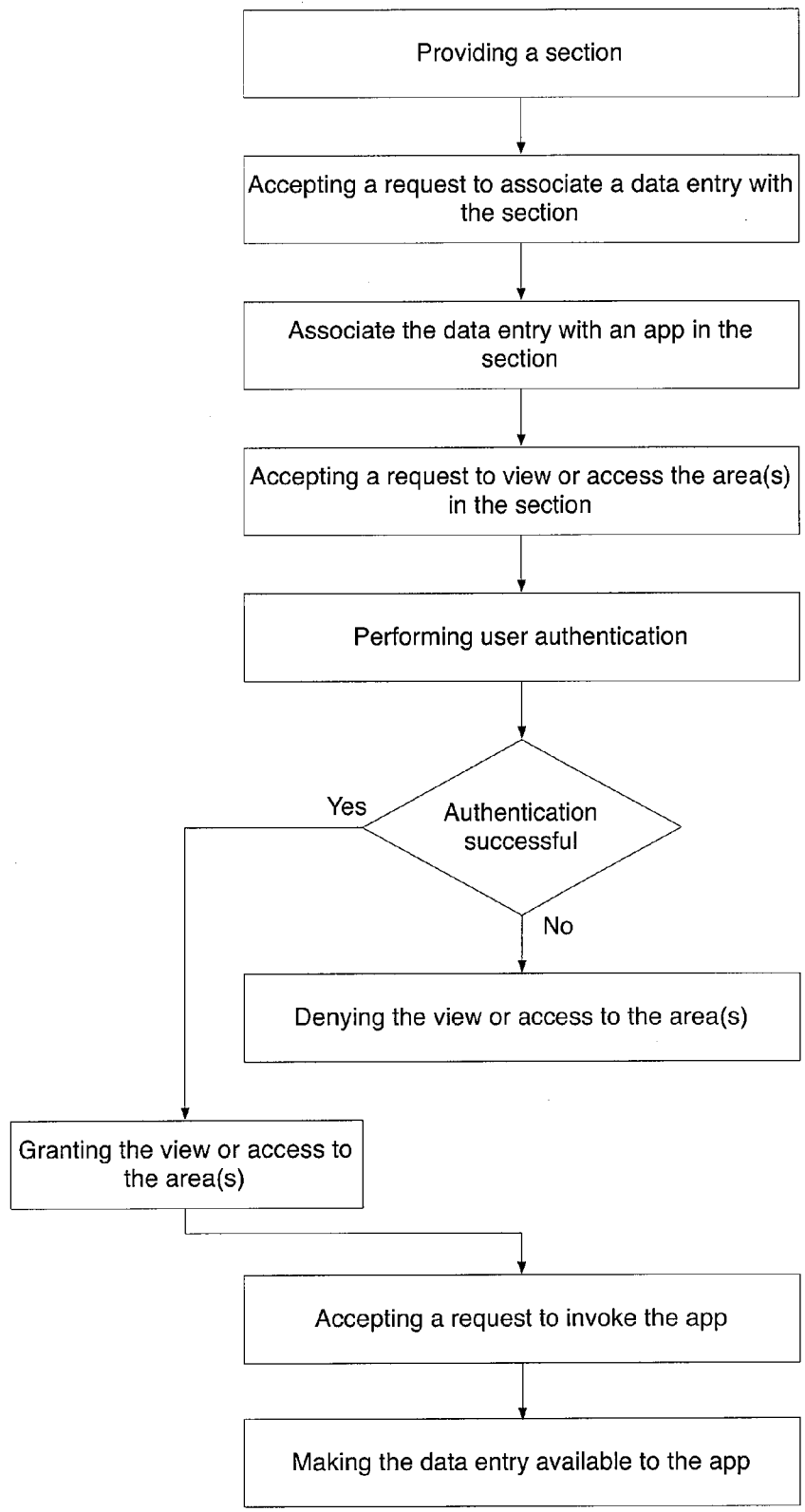
FIG. 4 shows another computerized method in accordance with an embodiment.

FIG. 4 shows a flow diagram of an exemplary process for assigning a data entry (e.g., a contact entry, a photo, an email address) to a section of restricted areas available on a device, such as the one shown in FIG. 1. For instance, the user interface provides a section of restricted areas, views or screens. It accepts from a user a request to associate a data entry with the section. The User Request Handler identifies one or more apps that can handle the type of the data entry or are otherwise associated with the type, and associates the data entry with the one or more apps. It stores this association information in Secure Access Definitions. The User Interface accepts a request to view or access a restricted area in the section. The Authenticator performs user authentication. If successful, it grants access to the area; otherwise it denies the access. When the User Request Handler accepts a request to invoke one of the one or more apps in the area upon successful authentication, it makes available the data entry or data related to the data entry to the invoked app.

The embodiments as described above enables a user to restrict access to an app that may not have any authentication capability itself, without the need for the device-wide authentication. For example, a parent may create a secure visual area, and place a phone app in that area, so that his kids cannot access the app without successful authentication. Or he may place a video browsing app or a Web browser in the secure area, which only requires authentication outside a certain period during a day, given that access to the date setting function for the device is also restricted. In the other words, an embodiment of the present invention enables a user to organize and manage invocation or execution-level authentication for a group of apps collectively even when the apps are not capable of doing so.

In some embodiments, data from restricted apps may not be visible or accessible to apps whose access is otherwise unrestricted. For example, if a contact book app is restricted while a phone app is not, then the phone app although functional (e.g., for making calls) cannot access to the data provided or otherwise maintained by the contact book app, and history information that the phone app may maintain should hide or otherwise omit entries that are derived from or otherwise related to the data of the contact book app.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated. For instance, method steps described herein may be performed in alternative orders. Various embodiments of the invention include logic stored on computer readable media, the logic configured to perform methods of the invention. The examples provided herein are exemplary and are not meant to be exclusive.

What is claimed is:

1. A method for restricting access to an application comprising:

presenting, by a computer system, a first user interface area to a user;

providing, by the computer system, the application, wherein the application is associated with the first user interface area;

in response to receiving a request to access the application, activating, by the computer system, the application;

providing, by the computer system, a second user interface area, wherein the second user interface area is associated with a credential;

in response to receiving a request to associate the application with the second user interface area, removing the application from the first user interface area, and moving the application to the second user interface area;

in response to receiving a request to access the second user interface area, performing, by the computer system, an authentication based on the credential;

determining that the authentication is successful;

in response to determining that the authentication is successful, presenting the application to the user; and in relation to presenting the application to the user, and in response to receiving a request to access the application, activating the application.

2. The method of claim 1, wherein the second user interface area comprises a folder, an icon, a page, a view, a virtual screen, or a layout of a graphical element on a computing device; and wherein the request to associate the application with the second user interface area comprises a tactile indication from the user of placing the application in or assigning the application to the second user interface area.

3. The method of claim 1, wherein the authentication comprises an authentication with a user, the user being associated with the computer system; and wherein the credential comprises credentials accessible by the computer system.

4. The method of claim 1, wherein removing the application from the first user interface area comprises:
preventing the user from accessing the application in the first user interface area by making the application invisible in the first user interface area; and
wherein moving the application to the second user interface area comprises allowing the user to access the application in the second user interface area, by the computer system, by making the application visible in the second user interface area.

5. The method of claim 1, further comprising:
providing, by the computer system, a second application, wherein the second application is associated with the second user interface area, and is invisible to the user; and
wherein presenting the application to the user comprises presenting the application and the second application to the user.

6. The method of claim 1, further comprising:
providing, by the computer system, a third user interface area, wherein the third user interface area is associated with a second credential;
providing, by the computer system, a third application and a fourth application, wherein the third application and the fourth application are associated with the third user interface area, and are invisible to the user;
in response to receiving a request to access the third user interface area, performing, by the computer system, an authentication based on the second credential;
determining that the authentication based on the second credential is successful; and
in response to determining that the authentication based on the second credential is successful, presenting the third application and the fourth application to the user.

7. The method of claim 1, further comprising:
providing, by the computer system, a second application, wherein the second application is associated with the first user interface area;
providing, by the computer system, a first data, wherein the first data is associated with the second application, and the first data is associated with a type of data;
providing, by the computer system, a third application, wherein the third application is associated with the first user interface area, and the third application is associated with the type of data;
in response to receiving a request to access the third application, activating, by the computer system, the third application;
presenting, by the computer system, a second data via the third application, wherein the second data comprises the first data;
in response to receiving a request to associate the second application with the second user interface area, removing the second application from the first user interface area, and moving the second application to the second user interface area;
in response to receiving a second request to access the third application, activating, by the computer system, the third application; and
presenting, by the computer system, a third data via the third application, wherein the third data does not comprise the first data.

8. The method of claim 7, wherein the second application comprises an application capable of storing contact information; and
wherein the third application comprises an application capable of establishing or providing a communication between the user and a second user.

9. The method of claim 7, wherein:
presenting the second data via the third application comprises:
in response to receiving an indication of the type of data, the indication being associated with the third application, presenting, by the computer system, the second data via the third application, wherein the second data comprises the first data; and presenting the third data via the third application comprises:
in response to receiving a second indication of the type of data, the second indication being associated with the third application, presenting, by the computer system, the third data via the third application, wherein the third data does not comprise the first data.

10. The method of claim 1, wherein presenting the application to the user comprises:
presenting, by the computer system, the second user interface area to the user, the second user interface area including an indication of the application.

11. The method of claim 1, further comprising:
determining, by the computer system, an inactivity with the second user interface area;
determining, by the computer system, that the inactivity exceeds a period of time; and
in response to determining that the inactivity exceeds the period of time, making the second user interface area inaccessible to the user.

12. The method of claim 11, wherein making the second user interface area inaccessible to the user comprises making, by the computer system, the second user interface invisible to the user.

13. The method of claim 1, further comprising:
associating a period of time with the second user interface area;
determining, by the computer system, an inactivity with the application;
determining, by the computer system, the inactivity exceeds the period of time; and
in response to determining that the inactivity exceeds the period of time, making the application invisible to the user.

14. A system comprising:
a processor; and
a memory communicatively coupled to the processor when the system is operational, the memory bearing processor-executable instructions that, when executed on the system, cause the system at least to:
provide a first user interface area and a second user interface area;
provide a first application and a second application, wherein the first application is associated with the first user interface area and a type of data, and the second application is associated with the second user interface area and the type of data;
receive a first data, wherein the first data is associated with the type of data and a first address;
in response to receiving the first data, associate the first data with the first application;
receive a request to associate the first address with the second user interface area;
receive a second data, wherein the second data is associated with the type of data and a second address;
determine that the second address matches the first address; and in response to determining that the second address matches the first address, associate the second data with the second application.

15. The system of claim 14, wherein the first data comprises a message, and the first address identifies a sender of the message.

16. The system of claim 14, wherein the second user interface area is associated with a credential, wherein the request to associate the first address with the second user interface area comprises a request from a user to associate the first address with the second user interface area, and wherein the memory further bears processor-executable instructions that, when executed on the processor, cause the system at least to:

in response to receiving a request to access the second user interface area, perform an authentication based on the credential;

determine that the authentication is successful;

in response to determining that the authentication is successful, present the second application to the user;

in response to receiving a request to access the second application, activate the second application; and in relation to activating the second application, present the second data to the user.

17. The system of claim 14, wherein the memory further bears processor-executable instructions that, when executed on the processor, cause the system at least to:

receive a third data, wherein the third data is associated with the type of data and a third address;

determine that the third address does not match the first address; and in response to determining that the third address does not match the first address, associate the third data with the first application.

18. A non-transitory computer-readable storage medium bearing computer-readable instructions that, when executed on a computer, cause the computer to perform operations comprising:

providing a first user interface area;

providing an application, wherein the application is associated with the first user interface area;

in response to receiving a request to access the application, activating the application;

providing a second user interface area, wherein the second user interface area is associated with a credential;

in response to receiving a request to associate the application with the second user interface area, associating the application with the second user interface area;

in response to receiving a second request to access the application, performing an authentication based on the credential;

determining that the authentication is successful; and in response to determining that the authentication is successful, activating the application.

\* \* \* \* \*